United States Patent
Flament et al.

(10) Patent No.: US 10,679,091 B2
(45) Date of Patent: Jun. 9, 2020

(54) IMAGE BOX FILTERING FOR OPTICAL CHARACTER RECOGNITION

(71) Applicant: Open Text Corporation, Waterloo (CA)

(72) Inventors: Arnaud G. Flament, Sunnyvale, CA (US); Guillaume B. Koch, San Jose, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 16/525,354

(22) Filed: Jul. 29, 2019

(65) Prior Publication Data

US 2019/0354792 A1 Nov. 21, 2019

Related U.S. Application Data

(63) Continuation of application No. 14/788,170, filed on Jun. 30, 2015, now Pat. No. 10,395,133.

(60) Provisional application No. 62/158,775, filed on May 8, 2015.

(51) Int. Cl.
   *G06K 9/00* (2006.01)
   *G06K 9/46* (2006.01)
   *G06K 9/18* (2006.01)

(52) U.S. Cl.
   CPC ............. *G06K 9/46* (2013.01); *G06K 9/18* (2013.01); *G06K 2009/4666* (2013.01)

(58) Field of Classification Search
   None
   See application file for complete search history.

(56) References Cited

U.S. PATENT DOCUMENTS

| | | | |
|---|---|---|---|
| 8,009,928 B1 * | 8/2011 | Manmatha | G06K 9/325 382/173 |
| 1,039,513 A1 | 8/2019 | Flament et al. | |
| 2008/0002916 A1 | 1/2008 | Vincent et al. | |
| 2010/0226573 A1 | 9/2010 | Lertrattanapanich et al. | |
| 2012/0155745 A1 * | 6/2012 | Park | G06K 9/00637 382/154 |
| 2014/0003717 A1 * | 1/2014 | Brito | G06K 9/00449 382/170 |
| 2014/0003721 A1 * | 1/2014 | Saund | G06K 9/00449 382/182 |
| 2014/0029853 A1 * | 1/2014 | Xue | G06K 9/18 382/182 |

OTHER PUBLICATIONS

Office Action issued for U.S. Appl. No. 14/788,170, dated May 4, 2017, 12 pages.
Office Action issued for U.S. Appl. No. 14/788,170, dated Nov. 6, 2017, 13 pages.

(Continued)

*Primary Examiner* — Fred H Hu
(74) *Attorney, Agent, or Firm* — Sprinkle IP Law Group

(57) ABSTRACT

A method for box filtering includes obtaining, by a computing device, a form image, and identifying, by the computing device, a region of the form image that includes boxes. Vertical lines in the region of the form image are detected. The boxes in the region are detected according to the plurality of vertical lines, and image content is extracted from the boxes.

20 Claims, 9 Drawing Sheets

(56) References Cited

OTHER PUBLICATIONS

Office Action issued for U.S. Appl. No. 14/788,170, dated May 31, 2018, 17 pages.
Office Action issued for U.S. Appl. No. 14/788,170, dated Dec. 11, 2018, 19 pages.
Notice of Allowance issued for U.S. Appl. No. 14/788,170, dated Apr. 11, 2019, 8 pages.

* cited by examiner

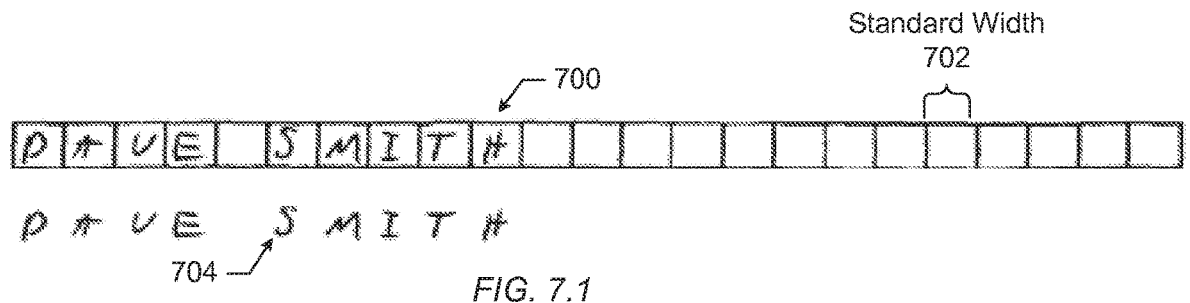
FIG. 7.1
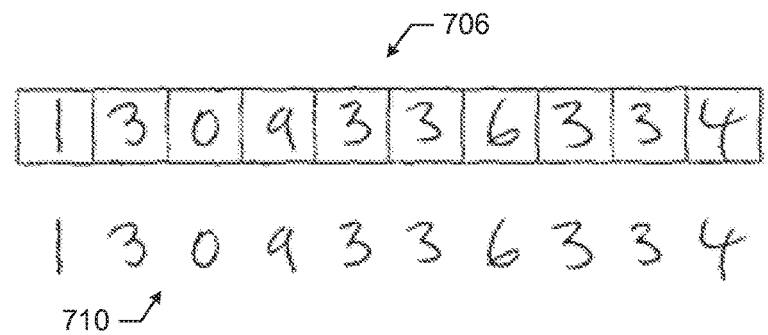
FIG. 7.2
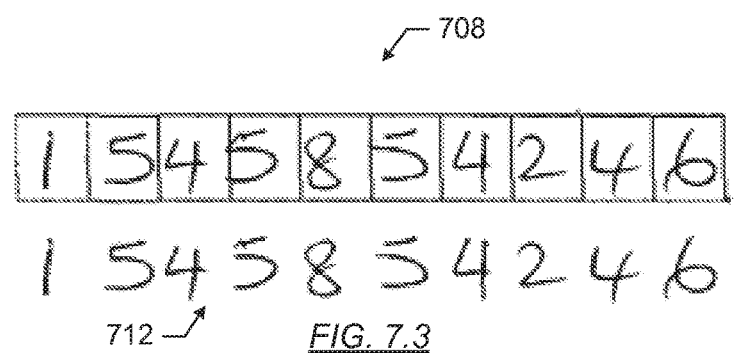
FIG. 7.3
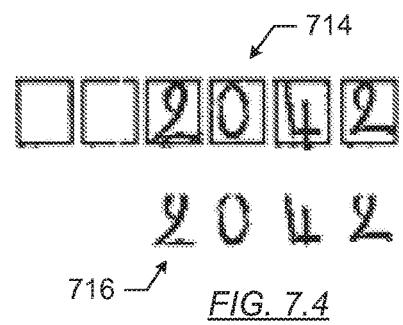
FIG. 7.4

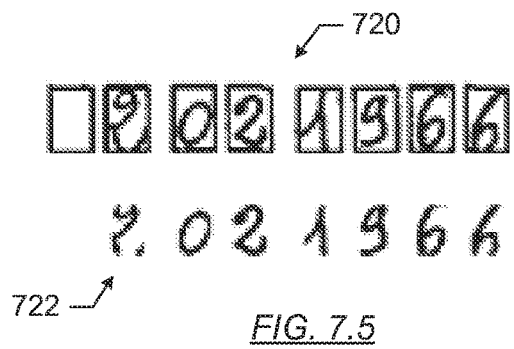
FIG. 7.5
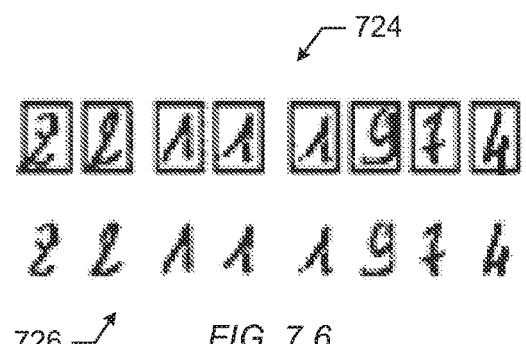
FIG. 7.6
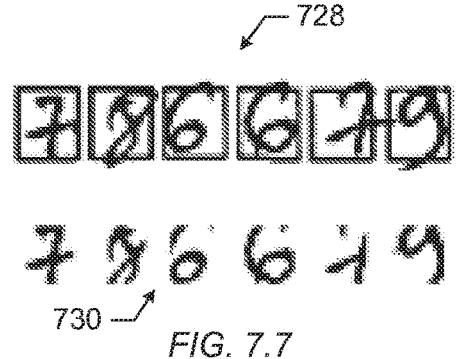
FIG. 7.7
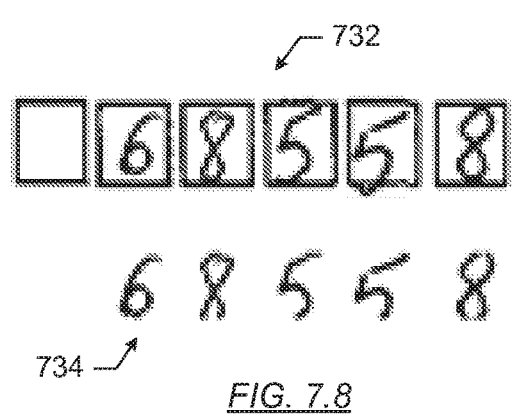
FIG. 7.8

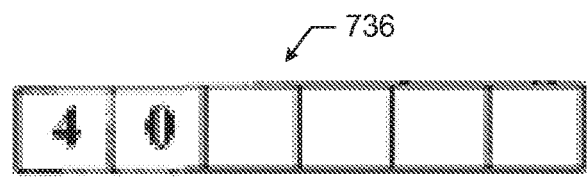
FIG. 7.9
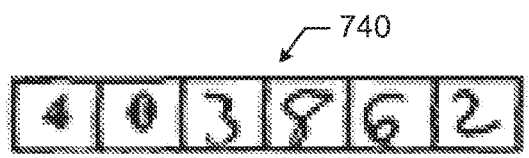
FIG. 7.10
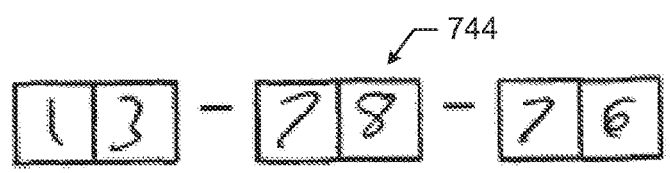
FIG. 7.11
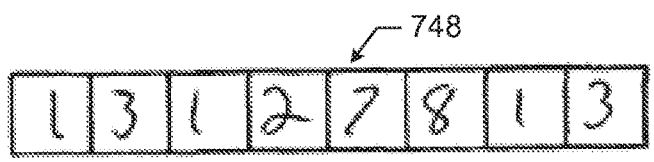
FIG. 7.12

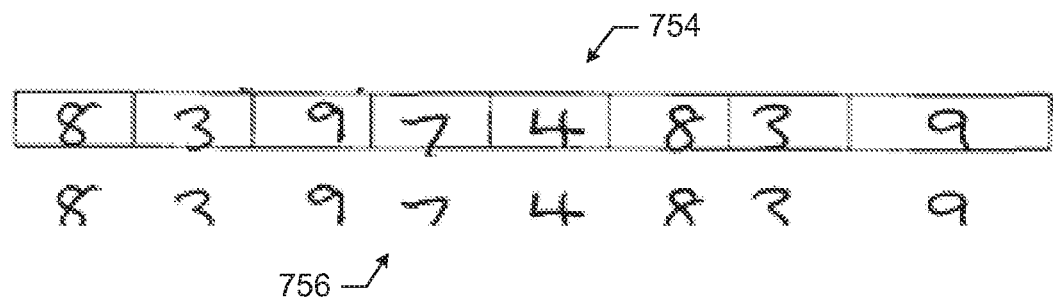
FIG. 7.13
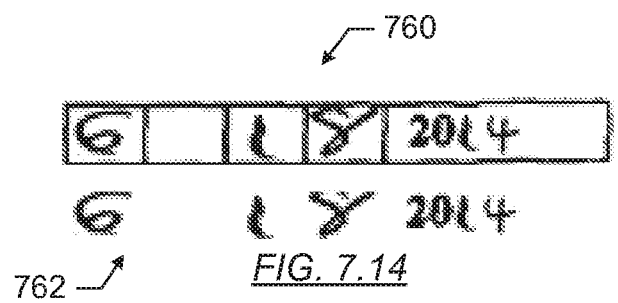
FIG. 7.14
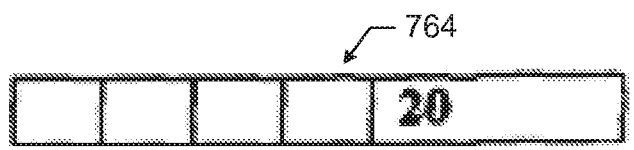
FIG. 7.15
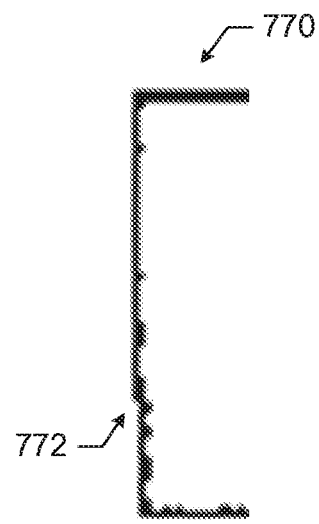
FIG. 7.16

IMAGE BOX FILTERING FOR OPTICAL CHARACTER RECOGNITION

CROSS-REFERENCE TO RELATED APPLICATIONS

This application is a continuation of, and claims a benefit of priority under 35 U.S.C. 120 from U.S. patent application Ser. No. 14/788,170 filed Jun. 30, 2015, entitled "Image Box Filtering for Optical Character Recognition", issued as U.S. Pat. No. 10,395,133, which claims a benefit of priority under 35 U.S.C. § 119(e) from U.S. Provisional Patent Application No. 62/158,775 filed May 8, 2015, entitled "Image Box Filtering for Optical Character Recognition", which are hereby fully incorporated herein by reference for all purposes.

BACKGROUND

Optical character recognition (OCR) is the process of identifying text characters from an image. OCR may be performed where the incoming images are scanned images having computer text and/or handwritten text on the images. For example, an individual may handwrite information into a paper form and transmit the paper form to a company for processing. The company may want to extract handwritten information from the form in order to perform additional steps, such as creating an account for the individual, performing application processing, or other action. Many forms have boxes. The boxes may assist the user in entering data in the form by indicating the number of characters to enter and providing a defined spacing between characters.

BRIEF DESCRIPTION OF DRAWINGS

FIGS. 7.1, 7.2, 7.3, 7.4, 7.5, 7.6, 7.7, 7.8, 7.9, 7.10, 7.11, 7.12, 7.13, 7.14, 7.15, and 7.16 show examples in accordance with one or more embodiments of the technology.

DETAILED DESCRIPTION

Figure 1:
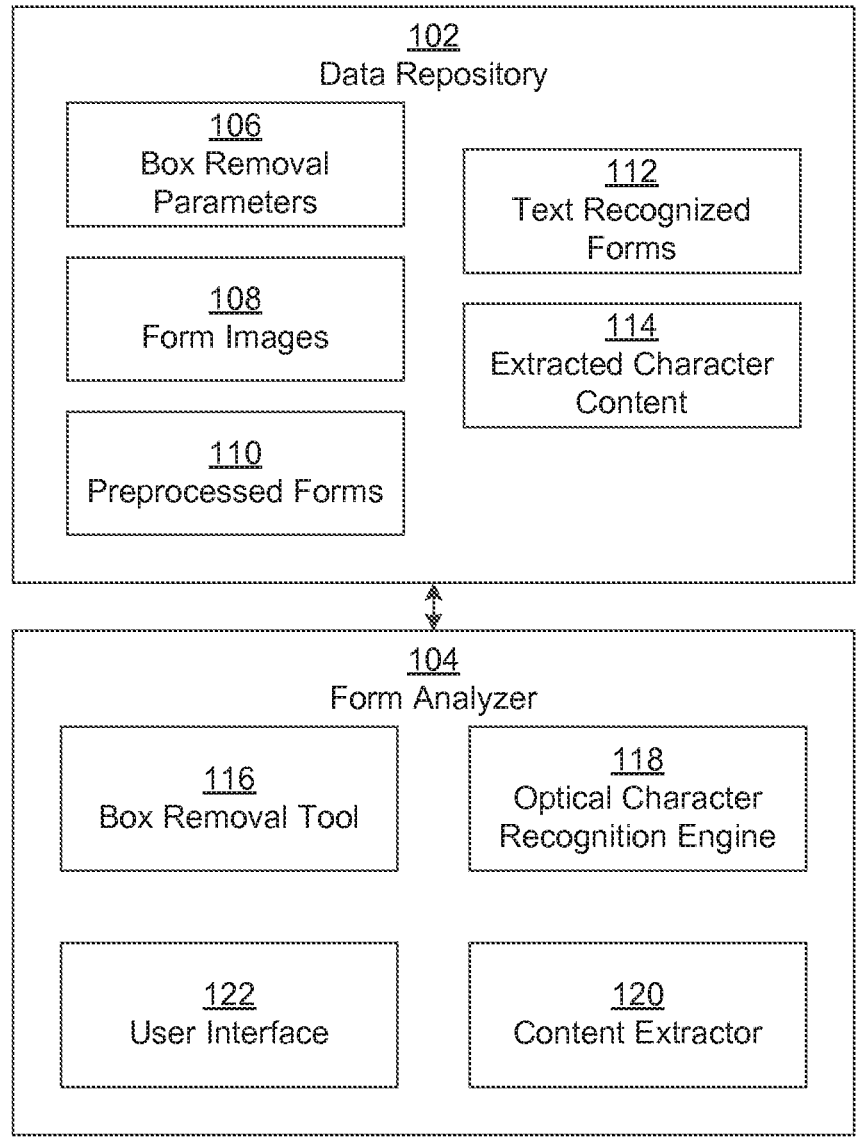
FIGS. 1, 2, and 3 show a schematic diagram of a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to removing boxes from forms. In particular, pre-printed boxes are used on forms and other documents to guide the end user or customer to write. These boxes may cause errors when an optical character recognition (OCR) engine recognizes handwritten and preprinted characters from the boxes. One or more embodiments perform an image pre-filtering in order to remove the boxes before performing an OCR extraction.

In general, a form is a document that has fields for a user to submit data. For example, a form may be a new account form of a particular version, an invoice, an application form, W-2 2015 version, or any other type of form. A form may have one or more instances or copies. The instances of the form may be transmitted to users for submitting data. An instance of a form in which a user has entered data may be referred to as a filled form. An empty form is a form that has not been filled by the user. In one or more embodiments of the technology, the form may include collinear sets of boxes. Each set of boxes may correspond to a discrete item of data to be extracted. For example, a set of boxes may correspond to first name, a second set of boxes may correspond to a last name, a third set of boxes may correspond to an account number, and so forth.

FIG. 1 shows a schematic diagram of a system in accordance with one or more embodiments of the technology. As shown in FIG. 1, a data repository (102) is connected to a form analyzer (104). The connection may be direct, indirect, via a network, via one or more application programming interfaces, other connection, or a combination thereof. In one or more embodiments of the technology, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. The data repository (102) includes functionality to store box removal parameters (106), form images (108), preprocessed forms (110), text recognized forms (112), and extracted character content (114).

In one or more embodiments of the technology, box removal parameters (106) are parameters with corresponding values. The values define one or more guidelines to remove one or more boxes on one or more types of forms. For example, the box removal parameters (106) may include a region parameter, a margin parameter, a sliding window parameter, a box type parameter, and a width variation parameter.

With respect to the region parameters, a region parameter includes a region identifier of a region of boxes. The region includes multiple boxes and may include white space around the boxes. In some embodiments, the region may also include some text and other markings around the white space. In other words, rather than specifying each individual box, one or more embodiments allow for specifying the general area around the set of boxes including whitespace around the set of boxes. Further, a margin of error may exist that allows the user to include in the region markings that are not part of the set of boxes. Such markings may be minimal such as to not interfere with the box filtering or extraction. The white space may be white space in an empty form and have markings in a filled form, or may be the form background. The region identifier may be an identifier relative to one or more positions on the form. For example, the region identifier may be with respect to one or more corners or sides of the form. By way of another example, the region identifier may be defined with respect to one or more anchor points (e.g., words or other markers that have set positions) in the form.

The margin parameter specifies the margins within each box within which markings are extracted. In other words, the margin specifies a region within the detected boundaries of a box that are excluded from extraction. In other words, the interior of the box that is not within the margins of the boxes are extracted. By having margins which are not extracted, one or more embodiments may ensure that the boundaries of the boxes are not extracted. Top, bottom, left, and right margins may be individually or together defined in one or more groups as part of the margin parameters. Further, the margin parameters may be defined individually for each region, a set of regions, or for the entire form. An example of the box with margins is discussed below in reference to FIG. 3 in accordance with one or more embodiments of the technology.

Continuing with the box removal parameters in FIG. 1, the sliding window parameter specifies a size of sliding window in accordance with one or more embodiments of the technology. A sliding window defines a degree of deviation from a straight line in a boundary of a box. In particular, in an image, the vertical bar demarcating the boundary of the box may not be completely straight. An example of a deviation is shown in FIG. 7.16. Similarly, a horizontal bar in the image may not be straight. The sliding window provides a mechanism to identify boundaries of a box when the boundaries are not straight. An example of a region with a sliding window is discussed below with reference to FIG. 2 in accordance with one or more embodiments of the technology.

Continuing with the box removal parameters in FIG. 1, in one or more embodiments of the technology, a box type parameter may be used to specify a type of box in the region. By way of an example, a box may be a complete box type, a comb box type, or other box. In the example, a complete box is a box that has boundaries on all sides. A comb shaped box is a box that does not have a top horizontal bar, and may have smaller side bars.

The box removal parameters may include parameters for defining when a box is detected. For example, a width variation parameter defines an amount of variation permissible in widths of boxes for a same number of characters. In the example, the widths for single character boxes may be assumed to be the same width. However, if a scanned image, photograph, or other such image is used, variation may exist in the widths between the single character boxes. The width variation parameter may define how much variation is allowed to distinguish between box boundaries and filled content in a box. By way of another example, an absolute threshold or a percentage threshold of maximal value may be defined in the box removal parameters. The threshold may be used for detecting peaks in the vertical or horizontal boundaries of a box.

In some embodiments, only the aforementioned parameters are defined. In some embodiments, fewer than the aforementioned parameters are defined. In some embodiments, additional or alternative parameters are defined. A default set of box removal parameters may be defined. The default set of box removal parameters may be used when the user has not specified certain parameters, and/or to present to the user as a basis for modification.

The box removal parameters may be stored as a form template using any technique known in the art. In particular, any mechanism may be used to store the box removal parameters. By way of an example, the box removal parameters may be stored as an extensible mark-up language (XML) file with or without the form.

Form images (108) are images of filled forms that have at least some characters as image data. In other words, at least a portion of a form image has boxes that are images and information populated in to fields that are images, rather than computer encoded text (e.g., ASCII characters, Unicode, or other encoding). In some embodiments, the entire form image (108) is an image. For example, the form images may be computer generated images from computer forms, pictures of forms, scanned forms, or other forms.

In one or more embodiments of the technology, preprocessed forms (110) are form instances with image content extracted. In other words, preprocessed forms (110) are instances of one or more forms in which the image contents of the boxes are without the boxes. More specifically, the boxes are no longer present in the preprocessed forms. In other embodiments, the boxes may be present in preprocessed forms (110), but have an encoding added so as to be identifiable by later processing. Additional preprocessing, such as image sharpening, changing of image type, or other preprocessing may have been performed on the preprocessed forms (110).

In one or more embodiments of the technology, text recognized forms (112) are filled forms in which optical character recognition (OCR) has been performed on the filled forms. Thus, the image data for at least some of the characters is replaced or supplemented in the text recognized forms (112) with computer encoded text.

In one or more embodiments of the technology, extracted character content (114) is content extracted from the text recognized forms. In one or more embodiments of the technology, the extracted character content may include the grouping of characters as a string. For example, if the set of boxes is for a first name, the extracted character content is the string of characters having the first name. More particularly, when the set of boxes is removed in the preprocessed forms, images of each letter in the first name are individually in the same position on the preprocessed form in accordance with one or more embodiments of the technology. After OCR, each letter is identified as being in the same position, but the letter may be related to or otherwise encoded with the letter's corresponding ASCII value or other text encoding. Further, the letter may be individual and not as a group of letters. The extracted character content may be a grouping of letters that correspond to a set of boxes into a string. The extracted character content may further be stored separate from the form by the grouping, such as in a database record for the user.

Continuing with FIG. 1, the form analyzer (104) is hardware, software, firmware, or any combination thereof. The form analyzer (104) may include a box removal tool (116), an OCR engine (118), a content extractor (120), and a user interface (122). The box removal tool (116) is configured to remove boxes. In particular, the box removal tool (116) includes functionality to transform form images (108) into preprocessed forms (110). The OCR engine (118) is configured to recognize characters. In other words, the OCR engine (118) is configured to transform preprocessed forms (110) into text recognized forms (112). The content extractor (120) is configured to extract and store content from a text recognized form (112). In other words, the content extractor includes functionality to obtain the character content in the text recognized form (112) and store the extracted character content. The storage may be temporary, such as for transmission, and/or semi-permanent, such as in a database record. The form analyzer may also include a user interface (122) for interfacing with a user to specify the box removal parameters (106) and provide information during processing and preprocessing of filled forms as discussed below.

While FIG. 1 shows a configuration of components, other configurations may be used without departing from the scope of the technology. For example, various components may be combined to create a single component. As another example, the functionality performed by a single component may be performed by two or more components. By way of another example, the form image, preprocessed form, and text recognized form, or a subset thereof, for a form instance may be a single document file during different stages of processing. In other words, rather than storing multiple files, where each file is the form instance during a particular stage of processing, the data repository may store a single file and the state of the content in the file is dependent on the stage of processing.

In one or more embodiments of the technology, a user may create a form template for each type of form. The form template may include the box removal parameters for each set of boxes defined for the type of form. Thus, the form template may be used to extract content for multiple forms of the same type. For example, consider the scenario in which a financial institution has a new account form that individuals print and send via postal mail. In the example, a representative of the financial institution may create a document template for the new account form. Thus, when new account forms are received via the physical postal mail, the new account forms may be scanned, and the form template may be used to remove the boxes and extract the content. The extracted content may then be stored by the content extractor in a new account for the financial institution's customers.

Figure 2:
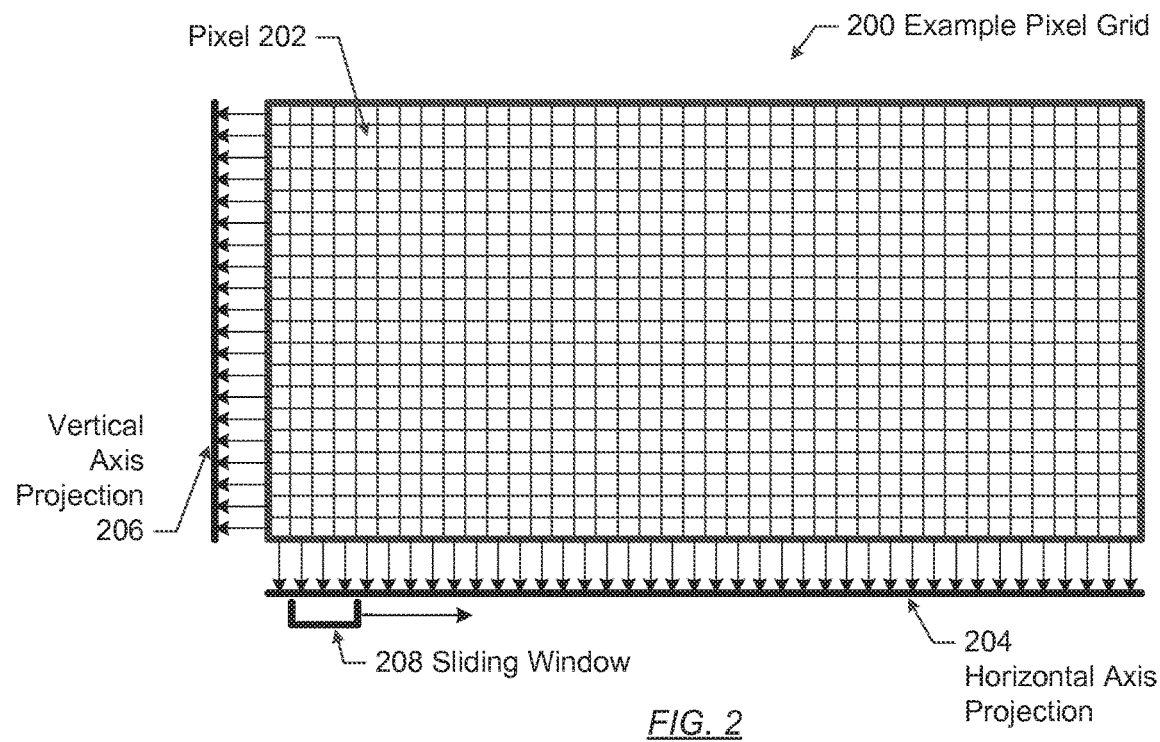

FIG. 2 shows a diagram of an image region defined as a pixel grid (200) in accordance with one or more embodiments of the technology. As shown in FIG. 2, the image region may be separated into pixels (e.g., pixel (202)). Pixels correspond to discrete points that may be a color, such as black, white, blue, red, or other color or combination. The shape, size, and number of pixels of the region may be different than shown in FIG. 2.

One or more embodiments may create a horizontal axis projection (204) in accordance with one or more embodiments of the technology. In one or more embodiments of the technology, a horizontal axis projection (204) is an ordered set of values that include a single combined value for a column of pixels in the region. The set of values may include additional values such as a minimum, color value, or other value for one or more columns. Each combined value in the horizontal axis projection is the number of pixels in a column that are a pre-defined color, such as black, of the boxes. Alternatively or additionally, each combined value in the horizontal axis projection may be the total number of pixels that are not a background color, such as white, yellow or other background color.

Similar to the horizontal axis projection (204), the vertical axis projection (206) includes an ordered set of combined values, where each combined value is the number of pixels in a row that are the pre-defined color. Alternatively or additionally, each combined value in the vertical axis projection may be the total number of pixels that are not a background color, such as white, yellow or other background color.

The horizontal axis projection and/or vertical axis projection may include one or more peaks in combined values. A peak is a local maximal value in a particular position of the horizontal axis projection. In other words, a peak value is greater than neighboring values. Peaks may be values that are greater than a threshold. A peak in the horizontal axis project (204) or in the vertical axis projection (206) may correspond to boundaries of the boxes, such as a vertical or horizontal line. In other words, peaks in the vertical axis projection (206) may be used to denote the top, if a top exists, and the bottom of boxes. Peaks in the horizontal axis projection (204) may correspond to sides of boxes. Peaks may also exist that correspond to characters, such as the numbers (e.g., "1", "4", "9"), letters (e.g., "L", "t", "U") and other characters, within a box.

In one or more embodiments of the technology, because scanned images of forms may be used, the boundaries of boxes may not be straight lines. In such a scenario, a sliding window (e.g., sliding window (208)) may be applied to the horizontal axis projection (204) and vertical axis projection (206) (not shown) to allow for some deviation. In such embodiments, the combined value may be a summation of the number of pixels in the sliding window complying with the color requirement.

By way of an example, consider the scenario in which the sliding window is size three, and columns A, B, C, D, and E are, in order, in the projection pixel grid, the predefined color for the sides of boxes is black, and the form background is white. In the example, column A has 6 black pixels, column B has 13 black pixels, column C has 9 black pixels, column D has 4 black pixel and column E has 3 black pixels. For the purposes of the example, assume that A and E have each have a neighbor having 0 black pixels. Without the sliding window, the horizontal axis projection may have combined values 6, 13, 9, 4, and 3 for columns A, B, C, D, and E, respectively. Using the sliding window, column A is assigned a value of 19 pixels (i.e., 0+6+13), column B is assigned a value of 28 pixels (i.e., 6+13+9), column C is assigned a value of 26 pixels (i.e., 13+9+4), column D is assigned a value of 16 pixels (i.e., 9+4+3), and column E is assigned a value of 7 pixels (i.e., 3+4+0). The size of the sliding window may be more or less than 3 without departing from the scope of the technology. Further, other aggregation functions may be used to combine values in a sliding window without departing from the scope of the technology.

Figure 3:
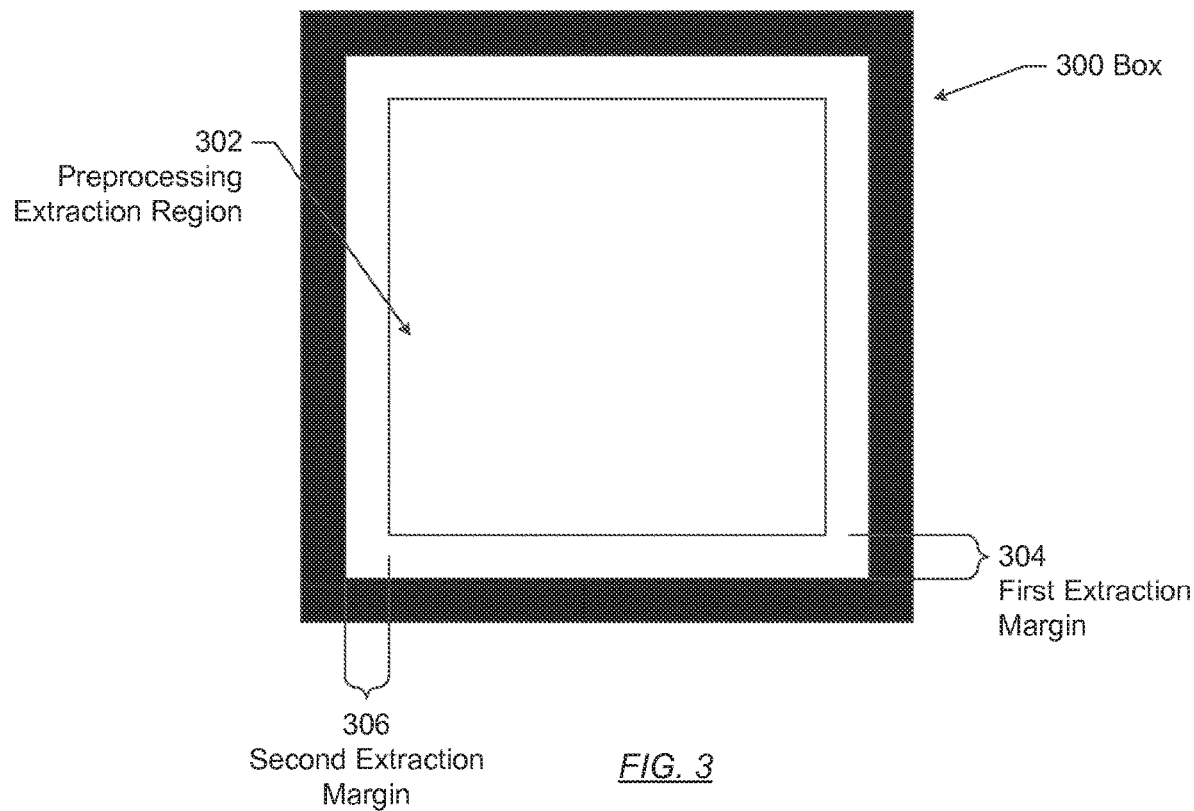

FIG. 3 shows an example schematic diagram of a box (300) in accordance with one or more embodiments of the technology. The preprocessing extraction region (302) is the portion of the image kept when the box is removed. In some embodiments, the preprocessing extraction region (302) is to the inside edge of the boundaries of the box. In other embodiments, such as shown in FIG. 3, margins (e.g., first extraction margin (304), second extraction margin (306)) may exist to ensure that the edge of the box is removed. The margins may be of various sizes and may be the same or heterogeneous with respect to top, bottom, left, and right margins.

Figure 4:
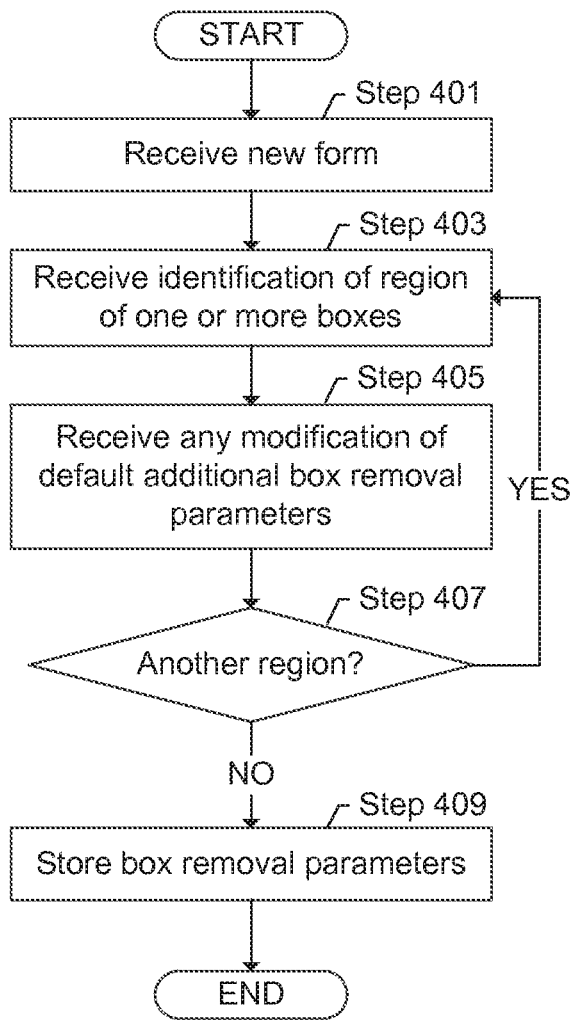
FIGS. 4, 5, and 6 show flowcharts in accordance with one or more embodiments of the technology.
Figure 5:
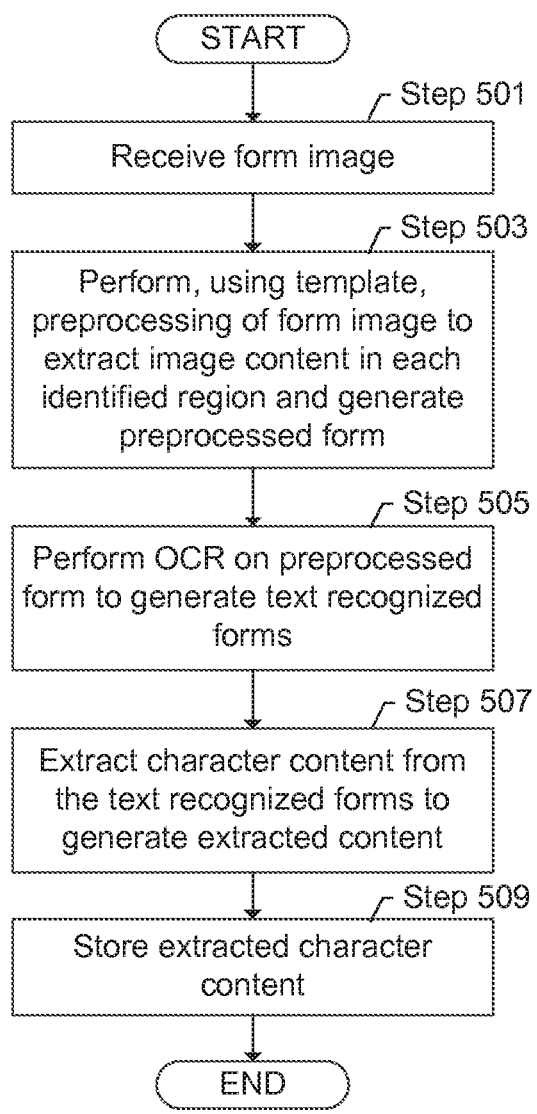
Figure 6:
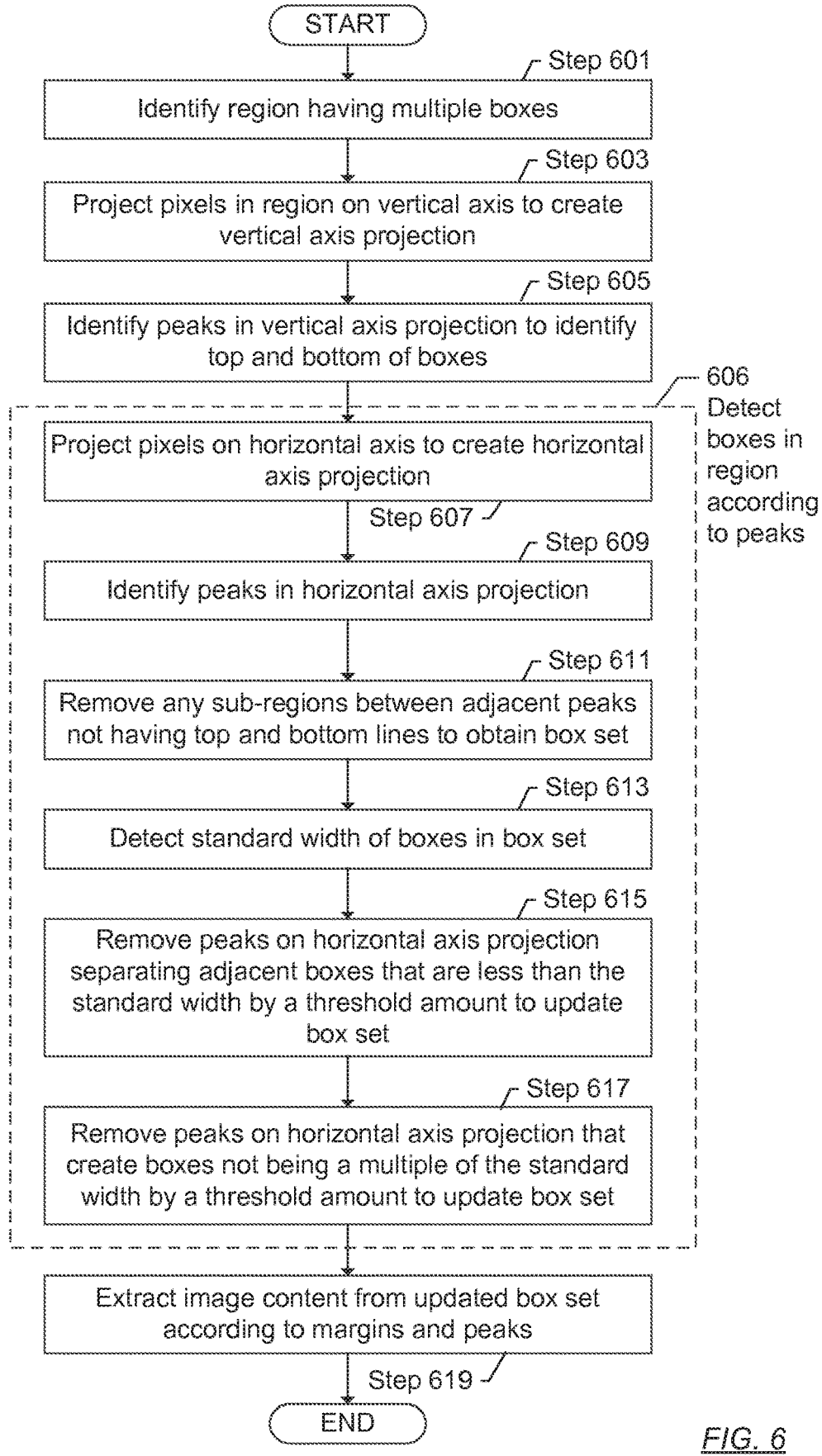

FIGS. 4-6 show flowcharts in accordance with one or more embodiments of the technology. The flowcharts shown in FIGS. 4-6 may be performed by the form analyzer discussed above with reference to FIG. 1. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows a flowchart for defining box removal parameters for a form in accordance with one or more embodiments of the technology. In Step 401, a new form is received in accordance with one or more embodiments of the technology. The new form is a version of a form that does not yet have box removal parameters defined. The form may be a filled form, an empty form, an original of a computer generated form (as opposed to a form image), a form image, or any other form.

In Step 403, identification of a region of one or more boxes is received in accordance with one or more embodiments of the technology. The region may include one or more boxes. In one or more embodiments of the technology, the user may specify the dimensions of the region without specifying the dimensions of individual boxes. Thus, if multiple boxes are in a region, the user does not need to specify the multiple boxes individually. In one or more embodiments, the user, using the user interface, may select the region. For example, the user may drag a cursor from one corner of the region to another corner of the region. As discussed above, the selection may not need to be exact as the region may include white space and some level of markings outside of the white space. By way of another example, the user may submit numerical region identifiers, such as distance from a corner or defined location in the form.

In Step 405, one or more additional box removal parameters are received for the identified region in accordance with one or more embodiments of the technology. For example, once selecting the region, the user may select to modify the default box removal parameters, generate new box removal parameters, or use a previous user defined box removal parameter. If the user selects to perform the modification, the user interface may display an options box that allows the user to submit the remaining box removal parameters. For example, the user interface may display a modal window by which the user may enter values into defined fields, select radio buttons, or perform other such processing. The user may submit values to adjust the box removal parameters.

In Step 407, a determination is made whether another region exists in accordance with one or more embodiments of the technology. If another region exits, the flow may proceed to Step 403. For example, the user may iterate through selecting regions and provide box removal individually and/or together for selected regions. If no other regions exist or if a different order of processing is performed, the flow may proceed to Step 409.

In Step 409, the box removal parameters are stored in accordance with one or more embodiments of the technology. For example, the box removal parameters may be stored in an XML file, in a document for the form, or using another technique. Rather than storing each set of box removal parameters, only the modified box removal parameters are stored. In other words, if default values are used, the default values are not stored for each particular form.

FIG. 5 shows a flowchart for extracting content from a form image in accordance with one or more embodiments of the technology. In Step 501, a form image is received in accordance with one or more embodiments of the technology. For example, a customer of the user may transmit the filled form to the user, via postal mail and/or via a computer network. If via postal mail, the user may scan the filled form using a scanner to create a form image. If via a computer network, the customer may take a picture of a tangible copy of the filled form, scan the filled form, transmit the filled form via fax machine, or perform another technique to obtain a form image. In some embodiments, the user may receive multiple filled forms. For example, if the form is a product registration form, the user may receive several thousand filled forms, from all of the user's customers, that the user batch processes. In such a scenario, the Steps of FIG. 5 may be performed for each form.

In Step 503, using the form template with the box removal parameters, preprocessing of the form image is performed to extract image content in each identified region and generate a preprocessed form in accordance with one or more embodiments of the technology. Extracting image contents may include copying the image contents into a new document with or without other contents that are not in a region identified by any box removal parameters. In some embodiments, extracting image contents may include changing the image color of the detected boxes to match the background, removing the detected boxes, adding an encoding to the boxes that is recognizable by a computer, or performing another action to filter out the boxes. Preprocessing of the form is discussed below and in FIG. 6.

Returning to FIG. 5, in Step 505, OCR recognition processing is performed on the preprocessed form to generate a text recognized form in accordance with one or more embodiments of the technology. The OCR recognition performed may include optical character recognition, optical word recognition, intelligent character recognition, intelligent word recognition, or any combination thereof. Any suitable algorithm may be used to perform the OCR recognition.

In Step 507, character content, or machine encoded text, is extracted from the text recognized form to generate extracted content. Any suitable algorithm may be used to perform the extraction. For example, the extraction may be based on the amount of space between characters, anchor points in the text recognized forms, region identifiers, and other information.

In Step 509, the extracted character content is stored in accordance with one or more embodiments of the technology. For example, a record for the customer may be created or updated with the extracted character content. Other techniques for storing the extracted character content may be used without departing from the scope of the technology.

FIG. 6 shows a flowchart for preprocessing of a form for image content extraction in accordance with one or more embodiments of the technology. In one or more embodiments, the Steps of FIG. 6 are described with respect to a single region. The Steps of FIG. 6 may be performed sequentially or in parallel for each region specified in the form template.

In Step 601, a region having multiple boxes is identified in accordance with one or more embodiments of the technology. In particular, a form template may be used to identify a region.

Once the region is determined vertical and horizontal lines in the region are identified. At least some of the vertical lines correspond to the sides of boxes. Some of the vertical lines may correspond to data entered into the boxes. Horizontal lines may correspond to the top and bottom of the boxes. The following discussion regarding FIG. 6 is directed to detecting vertical and horizontal lines using peaks in a projection. Although FIG. 6 shows using peaks to detect lines, other techniques may be used to detect the vertical and horizontal lines without departing from the scope of the technology. For example, a Hough transform may be used.

Continuing with FIG. 6, in Step 603, pixels in the region are projected on the vertical axis to create a vertical axis projection in accordance with one or more embodiments of the technology. In other words, for each row a determination is made as to the number of pixels that are in the row, and the number is added to the projection. If a sliding window is used, the aggregation for a row is performed across the rows in the sliding window. The sliding window is then moved to the next row and a new aggregation is performed. The use of the sliding window may allow for tops and bottoms of boxes that are not completely straight to be detected. In other words, if a bottom of a box has a first portion in a first row and a second portion in the neighboring row, the sliding window treats both rows as a single row for the purposes of aggregation. Thus, the bottom of the box is detectable even when spanning multiple rows.

In Step 605, peaks in the vertical axis projection are identified in accordance with one or more embodiments of the technology. Various techniques may be performed to detect peaks. For example, peaks may be detected based on a threshold. If the threshold is a percentage based threshold of the maximum value in the horizontal axis projection, then the maximum value in the horizontal axis projection is calculated. The threshold percentage of the calculated maximum value is computed to obtain an absolute value threshold. Values in the horizontal axis projection that are greater than the absolute value threshold may be detected as being a peak.

In one or more embodiments of the technology, the identification of peaks in the vertical axis projection may be used to identify the top and bottom of boxes. If a box is defined to be a comb type box, then only the bottom peak is identified in the vertical axis projection. If a box is defined to be a complete box type, then the top and bottom of the boxes are identified. In one or more embodiments of the technology, because the peaks denote the greatest number of pixels in a row being the particular color of the box, and the horizontal line for the bottom of a box generally has the most number pixels colored, the peak corresponds to the bottom of the box. Similarly, for boxes that have a top, a same attribute may exist. In other embodiments, if the region is for a single row of boxes, the bottom and the top of the box may be identified as the bottom most and top most peak, respectively, in the vertical axis projection.

Using the peaks in the vertical axis projection, boxes are detected in the region (606) in accordance with one or more embodiments of the technology. FIG. 6 shows a set of steps for detecting boxes in the region using the peaks in the horizontal axis projection in accordance with one or more embodiments of the technology. Other techniques may be used without departing from the scope of the technology.

In Step 607 of box 606, pixels are projected on the horizontal axis to create a horizontal axis projection in accordance with one or more embodiments of the technology. Projecting pixels on the horizontal axis may be performed in a same or similar manner to projecting pixels on the vertical axis discussed above with reference to Step 603.

In Step 609, peaks in the horizontal axis projection are identified in accordance with one or more embodiments of the technology. Identifying peaks in the horizontal axis projection may be performed in a same or similar manner to identifying peaks in the vertical axis projection as discussed above with reference to Step 605.

In Step 611, any sub-regions between adjacent peaks in the vertical axis projection not having a top and bottom lines are removed to obtain a box set in accordance with one or more embodiments of the technology. In one or more embodiments, a box set is the set of sub-regions that are identified as being possible boxes. For each pair of adjacent peaks, a separate vertical axis projection may be performed on the sub-regions between the adjacent peaks to determine whether the sub-region has a top and a bottom that corresponds to the top and bottom identified in Step 605. In other words, a determination is made whether a top peak is in the same location in the sub-region's vertical axis projection as the location of the top peak in the region's vertical axis projection. A similar analysis may be performed for the bottom. If the sub-region does not have a top, the sub-region may be for a comb type box. If the sub-region does not have a top or a bottom, then the sub-region may be a space in between boxes, which may or may not include a hyphen or other such character. In such a scenario in which the sub-region is determined to be a space between boxes, the sub-region is not included in the box set. The processing of Step 611 discussed above, may be repeated for each pair of adjacent peaks to discard sub-regions that correspond to spaces between boxes. Adjacent peaks that are not discarded are in the box set.

In Step 613, the standard width of the boxes in the box set is detected in accordance with one or more embodiments of the technology. In one or more embodiments of the technology, the standard width of boxes may be performed by detecting the average of the boxes in the box set. Boxes that are less than the standard width may be determined to not be a box, but two boxes that include a value having a substantially vertical component (e.g., 1, 4). In such a scenario, the peak that separates the two boxes may be ignored (i.e., removed). In one or more embodiments of the technology, some boxes may be larger than the standard width. In such a scenario, larger boxes may be detected based on being a multiple of the standard width. Thresholds may be applied to allow for some deviation in the standard width. In other words, boxes that are not the standard width, but are within a threshold degree of variability as defined by the width variation parameter may be kept in the box set. By performing image processing to detect the standard width of the boxes, one or more embodiments allow for deviation in the size of the form when scanning. In other words, although the form may be defined as a standard sheet, when printed and rescanned or photographed and transformed into a form image, various image contents on the form may be smaller than the original width. However, detecting the standard width of boxes may be useful to allow for variation in the size of a same set of boxes on different instances of a form.

In Step 615, peaks on the horizontal axis projection separating adjacent boxes that are less than the standard width are removed in accordance with one or more embodiments of the technology. By removing the peaks, the resulting box set has the adjacent boxes combined.

In Step 617, peaks on the horizontal axis projection that create boxes which are not a multiple of the standard width by a threshold amount are removed in accordance with one or more embodiments of the technology. In other words, boxes that are designed for multiple characters may be a multiple of the standard width box for a single character. In order to distinguish the multiple character boundaries box from the image contents in the box, a determination is made whether a box is or is not a multiple of the standard width. If the box is not a multiple of the standard width at least by a threshold amount of variability, then the peak separating adjacent boxes are removed to create a box that is the multiple of the standard width.

In Step 619, image content is extracted from the boxes based on the margins and the remaining peaks. In other words, the remaining peaks in the horizontal axis projection and denoted in the box set are determined to be boundaries of a box. Similarly, top boundaries and bottom boundaries of the boxes are identified by the vertical axis projection. Thus, the boundaries of the box are removed. In one or more embodiments, the margins may be used to identify the preprocessing extraction region for extracting the image contents of the boxes. In other words, once the boundaries of the box are detected, the columns that are within the margins are identified and also not extracted. Image content that is within the box, but not in the identified margin is extracted.

In extracting image content, portions of the images of characters may be deleted even though not part of the box. For example, an "8" that intersects the boundary of the box may have the lower loop cut off. In such a scenario, corrective actions may be performed. In particular, if pixels intersect the detected boundaries of the box and an open loop is detected based on the intersection, the open loop may be closed by the form analyzer. Similarly, top bars, such as on the number "5" may be added when intersecting a box boundary based on the intersection and the trajectory. Thus, various techniques may be performed to apply the corrective actions.

FIGS. 7.1, 7.2, 7.3, 7.4, 7.5, 7.6, 7.7, 7.8, 7.9, 7.10, 7.11, 7.12, 7.13, 7.14, 7.15, and 7.16 show examples of images of regions with boxes and the regions with the boxes filtered out that have just extracted character images in accordance with one or more embodiments of the technology. The processing of the example set of boxes to generate the shown image contents may be performed using the Steps of FIG. 6 and by the box removal tool in FIG. 1. The following examples are for explanatory purposes only and not intended to limit the scope of the technology.

FIG. 7.1 shows an example of a standard set of boxes (700) of a filled form. As shown in FIG. 7.1, the scanned version of the filled form may not have completely straight lines for the boundaries. Further, letters such as E, I, and T in the filled form may have a similar size peak to the boundaries of the boxes in the horizontal axis projection. However, determining the standard width (702) of the box may be used to distinguish between characters entered by a customer and the boundaries of the box. Thus, as shown in FIG. 7.1, the words, Dave Smith (704) may be extracted.

FIGS. 7.2 and 7.3 show example of sets of boxes (706, 708) having thin edges. Boxes with thin edges may have high peaks as compared to surrounding values in the horizontal axis projection. Similar to FIG. 7.1, once the peaks are identified, the standard width of the boxes may be identified from the peaks and used to extract image contents (710, 712).

FIG. 7.4 shows an example of sets of boxes (714) having space between the boxes. As shown in FIG. 7.4, each pair of adjacent boxes has a space between the adjacent boxes. The top and the bottom of the boxes may be identified by the vertical axis projection for the region. Using a horizontal axis projection, the peaks denoting the boundaries of the boxes may be identified. Because contents of the box are within the box, sub-regions between adjacent peaks either have or do not have a matching top and bottom to the boundary as reflected in the sub-region's vertical axis projection. The sub-region that does not have matching top and bottom peaks are not part of the box set. The remaining sub-regions are a part of the box set. After extraction of the image contents (716) or as part of the extraction in FIG. 7.4, additional processing may be performed to close the loop on the twos and extend the line for the four.

Continuing with the examples, FIGS. 7.5 and 7.6 show sets of boxes (720, 722) having irregular spacing between boxes. In one or more embodiments, by removing the sub-regions from the box set that do not have top and bottom boundaries prior to determining the standard width of the boxes, the irregular spacing may be irrelevant. Thus, the image contents (724, 726) may be extracted FIGS. 7.7 and 7.8 show examples of sets of boxes (728, 732) having characters overflowing the boundaries of the boxes. The preprocessing may be performed to remove the boxes regardless of the overflowing characters. Thus, image contents (730, 734) may be extracted. Similar to FIG. 7.4 additional corrective action may be performed on the extracted image contents.

FIG. 7.9 shows an example of a set of boxes (736) having empty and non-empty parts. As shown, whether the boxes are empty may be irrelevant when extracting the image contents (738). FIG. 7.10 shows an example set of boxes (740) and corresponding extracted content (742) with both machine written and hand written characters. FIG. 7.11 shows an example set of boxes (744) with an artifact between groups of boxes in the set. Because one or more embodiments disregard sub-regions that do not have a top and a bottom, the artifacts are disregarded and not present in the image contents (746). Thus, artifacts may be used to guide a user to correctly enter information without unduly affecting the extracted contents.

FIG. 7.12 shows an example of boxes (748) skewed such as during the scanning (e.g., with a scanner or a camera). In other words, as shown in FIG. 7.12, the top horizontal line is not straight. However, using a sliding window on the vertical axis projection may be performed to allow for the amount of deviation of the top boundary. Thus, the image contents (750) may be extracted.

FIG. 7.13 shows an example set of boxes (754) having boxes with irregular sizes. As shown in FIG. 7.13, the box with the 9 is larger than the remaining boxes. However, the combination of allowing the box to be a multiple of the standard size and by a threshold degree of width variation, image contents (756) may be extracted.

FIG. 7.14 shows and example of a set of boxes (760) having boxes with irregular size and empty, non-empty, and machine and handwritten boxes as well as the corresponding extracted image contents (762) in accordance with one or more embodiments of the technology. FIG. 7.15 shows and example of a set of boxes (764) having boxes with irregular size and empty and non-empty boxes as well as the corresponding extracted image contents (766) in accordance with one or more embodiments of the technology. FIG. 7.16 shows an example boundary (770) of a box in which the boundary deviates by a pixel (772). In FIG. 7.16, without a sliding window of two pixels, the boundary may not be detected. By adding a sliding window of two pixels and summing the number of boxes in both columns that are of the pre-defined color, the boundary is detected in accordance with one or more embodiments of the technology.

Figure 8:
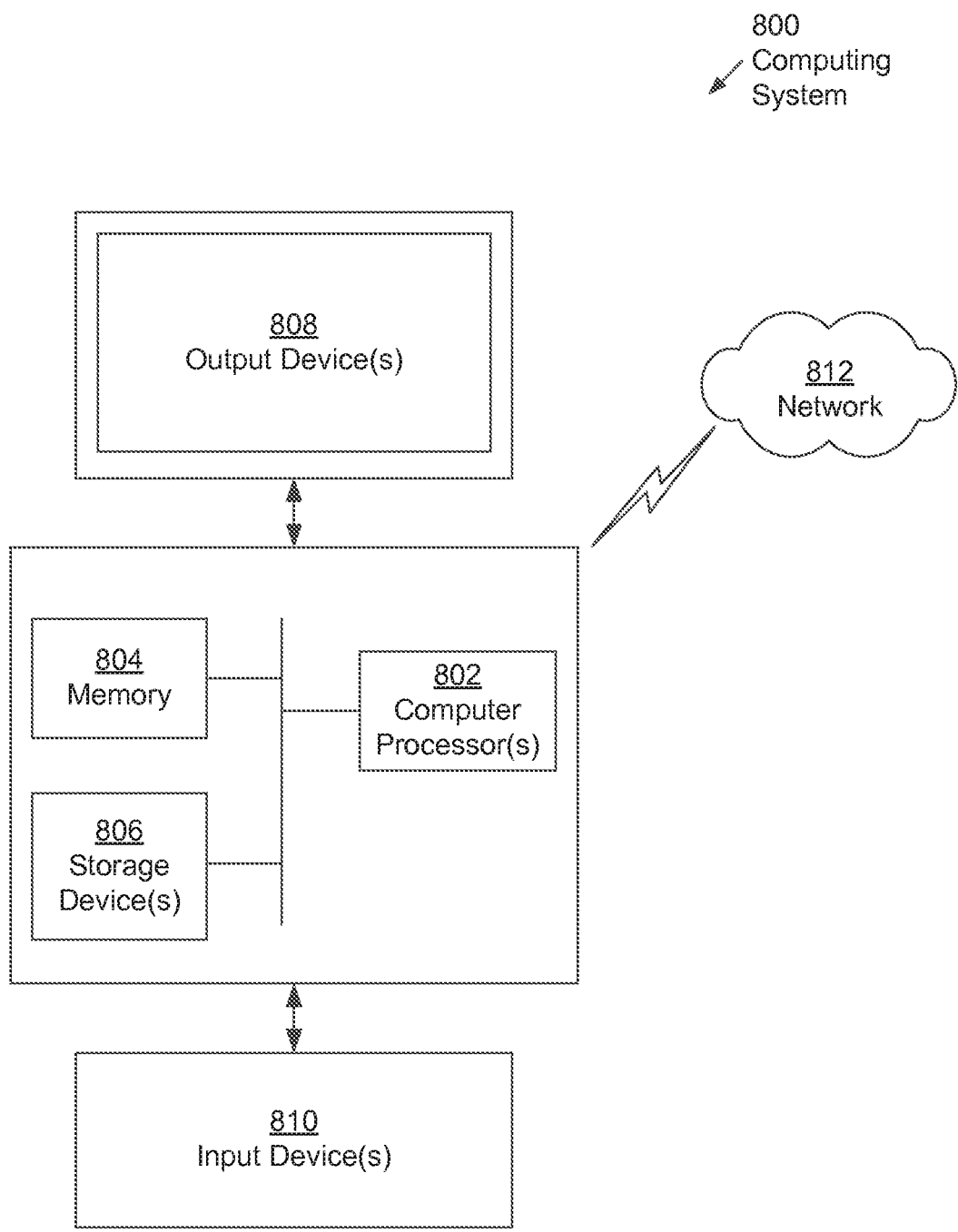
FIG. 8 shows a computing system in accordance with one or more embodiments of the technology.

Embodiments of the technology, such as the form analyzer shown in FIG. 1, may be implemented on a computing system. Any combination of mobile, desktop, server, embedded, or other types of hardware may be used. For example, FIG. 8 shows a computing system. The computing system may include functionality to execute one or more components of the system shown in FIG. 1. As shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A computer program product comprising a non-transitory computer readable medium storing a set of computer-readable instructions, the set of computer-readable instructions comprising instructions executable by a processor to:
   obtain a form image;
   identify a region of the obtained form image, the region comprising a plurality of boxes included in the obtained form image;
   load a set of box removal parameters, the set of box removal parameters comprising a sliding window parameter specifying a size of a sliding window;
   detect a plurality of vertical lines in the region of the obtained form image from a plurality of pixels in the region, the plurality of pixels comprising pixels representing the plurality of vertical lines, wherein each vertical line in the plurality of vertical lines is detected from a respective aggregation of pixels in the sliding window that comply with a color requirement;
   detect the plurality of boxes in the region based on the detected plurality of vertical lines;
   extract image content from the plurality of boxes; and
   generate a preprocessed form with the plurality of boxes removed, the preprocessed form including the image content extracted from the plurality of boxes.

2. The computer program product of claim 1, wherein the set of computer-readable instructions further comprise instructions executable to:
   perform optical character recognition on the image content in the preprocessed form to generate a text recognized form;
   extract character content from the text recognized form to generate extracted character content; and
   store the extracted character content.

3. The computer program product of claim 1, wherein the set of computer-readable instructions further comprise instructions executable to:
   project the plurality of pixels in the region onto a horizontal axis to create a horizontal axis projection; and
   identifying a first plurality of peaks in the horizontal axis projection, wherein the plurality of vertical lines are detected using the first plurality of peaks.

4. The computer program product of claim 3, wherein the set of computer-readable instructions further comprise instructions executable to:
   project the plurality of pixels on a vertical axis to create a vertical axis projection; and
   identify a second plurality of peaks in the vertical axis projection to detect a top and a bottom of each of the plurality of boxes.

5. The computer program product of claim 4, wherein the set of computer-readable instructions further comprise instructions executable to remove a sub-region of the region between adjacent peaks in the first plurality of peaks based on lacking the top and the bottom.

6. The computer program product of claim 3, wherein the set of box removal parameters comprises a box type parameter.

7. The computer program product of claim 6, wherein the set of computer-readable instructions further comprise instructions executable to:
   project the plurality of pixels on a vertical axis to create a vertical axis projection; and based on a determination that the box type parameter indicates a comb box, identify a second plurality of peaks in the vertical axis projection to detect a bottom of each of the plurality of boxes.

8. The computer program product of claim 3, wherein the set of computer-readable instructions further comprise instructions executable to:
 detect a standard width of the plurality of boxes based on the first plurality of peaks; and
 remove at least one peak from the first plurality of peaks that defines a boundary of a box that is less than the standard width by a threshold amount.

9. The computer program product of claim 3, wherein the set of computer-readable instructions further comprise instructions executable to:
 detect a standard width of the plurality of boxes based on the first plurality of peaks; and
 remove at least one peak from the first plurality of peaks that defines a boundary of a box that is greater than the standard width but not a multiple of the standard width.

10. The computer program product of claim 3, wherein extracting the image content from the plurality of boxes comprises:
 copying an image in each of the plurality of boxes within a defined margin.

11. A method for box filtering comprising:
 obtaining, by a computing device, a form image, the obtained from image comprising a plurality of boxes and image content in the plurality of boxes;
 identifying, by the computing device, a region of the obtained form image comprising the plurality of boxes included in the obtained form image;
 loading a set of box removal parameters, the set of box removal parameters comprising a sliding window parameter specifying a size of a sliding window;
 detecting a plurality of vertical lines in the region of the obtained form image from a plurality of pixels in the region, the plurality of pixels comprising pixels representing the plurality of vertical lines, wherein each vertical line in the plurality of vertical lines is detected from a respective aggregation of pixels in the sliding window that comply with a color requirement;
 detecting, by the computing device, the plurality of boxes in the region based on the detected plurality of vertical lines;
 extracting, by the computing device, the image content from the plurality of boxes; and
 generating a preprocessed form with the plurality of boxes removed, the preprocessed form including the image content extracted from the plurality of boxes.

12. The method of claim 11, further comprising:
 performing optical character recognition on the image content in the preprocessed form to generate a text recognized form;
 extracting character content from the text recognized form to generate extracted character content; and
 storing the extracted character content.

13. The method of claim 11, wherein detecting the plurality of vertical lines comprises:
 projecting, by the computing device, the plurality of pixels in the region onto a horizontal axis to create a horizontal axis projection; and
 identifying, by the computing device, a first plurality of peaks in the horizontal axis projection, wherein the plurality of vertical lines are detected using the first plurality of peaks.

14. The method of claim 13, wherein detecting the plurality of boxes in the region comprises:
 projecting the plurality of pixels on a vertical axis to create a vertical axis projection; and
 identifying a second plurality of peaks in the vertical axis projection to detect a top and a bottom of each of the plurality of boxes.

15. The method of claim 14, wherein detecting the plurality of boxes in the region comprises:
 removing a sub-region of the region between adjacent peaks in the first plurality of peaks based on lacking the top and the bottom.

16. The method of claim 13, wherein the set of box removal parameters comprises a box type parameter.

17. The method of claim 16, wherein detecting the plurality of boxes in the region comprises:
 projecting the plurality of pixels on a vertical axis to create a vertical axis projection; and
 based on a determination that the box type parameter indicates a comb box, identifying a second plurality of peaks in the vertical axis projection to detect a bottom of each of the plurality of boxes.

18. The method of claim 13, wherein detecting the plurality of boxes comprises:
 detecting a standard width of the plurality of boxes based on the first plurality of peaks; and
 removing at least one peak from the first plurality of peaks that defines a boundary of a box that is less than the standard width by a threshold amount.

19. The method of claim 13, wherein detecting the plurality of boxes comprises:
 detecting a standard width of the plurality of boxes based on the first plurality of peaks; and
 removing at least one peak from the first plurality of peaks that defines a boundary of a box that is greater than the standard width but not a multiple of the standard width.

20. The method of claim 11, wherein extracting the image content from the plurality of boxes comprises:
 copying an image in each of the plurality of boxes within a defined margin.

\* \* \* \* \*